United States Patent
Kelley et al.

(10) Patent No.: US 7,175,073 B2
(45) Date of Patent: Feb. 13, 2007

(54) SECURE CELL PHONE FOR ATM TRANSACTIONS

(75) Inventors: Edward E. Kelley, Wappingers Falls, NY (US); Franco Motika, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 10/906,690

(22) Filed: Mar. 2, 2005

(65) Prior Publication Data

US 2006/0200410 A1    Sep. 7, 2006

(51) Int. Cl.
*G07G 17/00* (2006.01)
(52) U.S. Cl. .................. 235/379; 235/380; 235/382; 705/43
(58) Field of Classification Search ............... 235/382; 902/8, 10; 705/43
See application file for complete search history.

(56) References Cited

U.S. PATENT DOCUMENTS

| 6,641,050 | B2 | 11/2003 | Kelley et al. |
| 2002/0034172 | A1 | 3/2002 | Ho |
| 2002/0078352 | A1 | 6/2002 | Angwin et al. |
| 2003/0101378 | A1 | 5/2003 | Ohkubo |
| 2005/0273626 | A1* | 12/2005 | Pearson et al. ............ 713/186 |

FOREIGN PATENT DOCUMENTS

GB    2410113 A  *  7/2005

OTHER PUBLICATIONS

USATODAY.com ("Japanese cell phone to offer ATM access") Jul. 16, 2002.*

* cited by examiner

*Primary Examiner*—Seung Ho Lee
(74) *Attorney, Agent, or Firm*—DeLio & Peterson, LLC; Kelly M. Nowak; James J. Cioffi

(57) ABSTRACT

A method, secure cell phone and system for securely accessing an automated banking machine using such secure cell phone. The secure cell phone includes a read only memory device in combination with two linear feedback shift registers for generating a unique security transaction code, which includes a cell phone identification concatenated with two pseudo random codes. The automated banking machine is called from the cell phone. One of the pseudo random codes is input into a software emulation of the cell phone circuitry running on the automated banking machine to generate a computed pseudo random code. This computed code is concatenated the input pseudo random code and a determined cell phone identification to generate a computed transaction code. The automated banking machine is securely accessed using the secure cell phone if the computed transaction code matches the unique security transaction code.

20 Claims, 2 Drawing Sheets

SECURE CELL PHONE FOR ATM TRANSACTIONS

BACKGROUND OF THE INVENTION

1. Field of the Invention

The present invention is directed generally to cellular phones, and in particular, to methods and apparatus for securely accessing an automated banking machine using a cellular phone.

2. Description of Related Art

A variety of automated banking machines are known for carrying out or supporting the conduct of transactions. For instance, a variety of customer service environment automated banking machines exist, such as, those for counting items received from or which are to be given to a customer. Other types of automated banking machines include those that validate items to provide the customer with access, value or privileges such as tickets, vouchers, checks or other financial instruments; or even those that provide users with the right to merchandise or services in an attended or a self-service environment.

Automated teller machines ("ATMs") are another common type of automated banking machine used by consumers for carrying out banking transactions. A wide variety of banking transactions may be carried out using ATMs such as, for example, cash withdrawals, deposits, fund transfers between accounts, bill payment, check cashing, money order purchases, stamp purchases, ticket purchases, phone card purchases, account balance inquiries, and the like. It is ultimately the particular banking machine, the system in which it is connected and the programming of the machine by the entity responsible for its operation that determine the types of banking transactions a customer can carry out on an ATM.

Generally, cards are the most widely used instrument for accessing and carrying out transactions on automated banking machines. Such cards used for carrying out transactions on automated banking machines include credit cards, debit cards, voucher cards, club cards, shopping cards, and the like. For instance, credit cards or debit cards are the most widely used instruments for accessing one's bank or credit union account from an ATM. However, there is currently a lack in the art for allowing a consumer to easily and securely access and carry out a transaction over an automated banking machine, and in particular over an ATM, using a cellular telephone (cell phone).

As the popularity of cell phones increase, together with new developments in cell phone technology, it is forecast that cell phones will be used more and more to replace the functions of these various instrumentation used to access and carry out transactions on automated banking machines, including ATMs. A number of advantages exist for replacing the numerous credit, debit, voucher, club and shopping cards, and the like, carried by consumers with cell phones that are capable of carrying out such functions. For instance, consumers will be able to carry and be responsible for fewer items, it reduces the risk of and amount of card loss, as well as reducing the risk of card theft, and it also reduces the number of pin numbers or card identification numbers the consumer may need to remember.

Thus, as the use of cell phones continue to proliferate and extend into the field of accessing automated banking machines, there exists a need in the art for easy, fast, safe and secure methods and systems for accessing and carrying out transactions on automated banking machines using cell phones.

SUMMARY OF THE INVENTION

Bearing in mind the problems and deficiencies of the prior art, it is therefore an object of the present invention to provide a secure cell phone for safely and securely accessing an automated banking machine.

It is another object of the present invention to provide a method for securely accessing an automated banking machine by cell phone that prevents any occurrences of theft, fraud or unauthorized uses of such cell phone.

A further object of the invention is to make a protected call between a secure cell phone and an automated banking machine, and based on such secure call carry out a banking transaction on such automated banking machine.

It is yet another object of the present invention to have all the security encoding contained entirely within the secure cell phone in a manner where it cannot be transmitted to, or read from, outside the cell phone.

Further, it is another object of the invention to require duplication of a unique security transaction code generated by circuitry of the secure cell phone at the automated banking machine for allowing the secured banking transaction to be carried out at the automated banking machine.

Still other objects and advantages of the invention will in part be obvious and will in part be apparent from the specification.

The above and other objects, which will be apparent to those skilled in the art, are achieved in the present invention, which is directed to a method for securely accessing an automated banking machine by cell phone. The method includes providing a cell phone containing circuitry that generates a unique security transaction code. This unique security transaction code includes a unique cell phone identification number for the cell phone concatenated with two pseudo random codes. An automated banking machine is called from the cell phone, whereby a software emulator of the circuitry embedded within the cell phone is determined at the automated banking machine. This software emulator is running on the automated banking machine. At least one of the pseudo random codes is then input into the software emulator to generate a computed pseudo random code. This computed pseudo random code is then concatenated with the input pseudo random code and a determined cell phone identification number to generate a computed transaction code. The automated banking machine is then securely accessed using the cell phone if the computed transaction code matches the unique security transaction code.

After the automated banking machine has been called from the cell phone, the method may further include the steps of authenticating that the call is coming from a secure cell phone by sending a communication between the automated banking machine and the cell phone. If the call is authentic, the unique security transaction code is then sent to the automated banking machine from the cell phone. The cell phone identification number is then determined at the automated banking machine using the received unique security transaction code. The communication for authenticating that the call may be a signal sent to the cell phone from the automated banking machine during the call, or a cell phone pre-identification that identifies the call as coming from a secure cell phone.

In this aspect of the invention, the circuitry of the cell phone includes a read only memory device, a secure linear feedback shift register having a unique linear feedback shift register sequence associated with the cell phone, a reference linear feedback shift register, and a free running oscillator.

The secure linear feedback shift register is driven by the free running oscillator to generate a first of the two pseudo random codes, while the reference linear feedback shift register is driven by the free running oscillator to generate a second of the two pseudo random codes. These first and second pseudo random codes are preferably extremely large unique pseudo random binary sequences.

After the automated banking machine has been securely accessed using the cell phone, a desired banking transaction to be performed at the cell phone is selected and transmitted to the automated banking machine via the secure call. This desired banking transaction is then performed at the automated banking machine during the secure call. These steps of selecting, transmitting and performing desired banking transactions may be repeated until all desired banking transactions are completed during the secure call from the cell phone to the automated banking machine. An essential feature of the invention is that upon completion of all the desired banking transactions, the automated banking machine stores the unique security transaction code associated with the particular cell phone to prevent the unique security transaction code from ever being used again in connection with such cell phone.

In another aspect, the invention is directed to a secure cell phone having a cell phone body. The cell phone body includes a read only memory device, a secure linear feedback shift register and a free running oscillator. The secure linear feedback shift register is driven by the free running oscillator to produce a first cycle count. A reference linear feedback shift register of the cell phone body is synchronized to the secure linear feedback shift register via the free running oscillator. This reference linear feedback shift register is driven by the free running oscillator to produce a second cycle count. The secure cell phone also includes a security code generator that produces a unique security transaction code. This unique security transaction code is a concatenation of the unique cell phone identification number and the first and the second cycle counts. Also incorporated in the cell phone body is a wireless communication interface for providing an input/output message function of secured information, which includes the unique security transaction code, between the cell phone body and an external automated banking machine.

In yet another aspect, the invention is directed to a secure system for accessing an automated banking machine from a secure cell phone. The system includes a secure cell phone body containing circuitry that generates a unique security transaction code. This unique security transaction code is comprised of a unique cell phone identification number for the cell phone concatenated with two pseudo random codes. The secure system also includes an automated banking machine and a software emulator within the automated banking machine. The software emulator emulates the functions of the cell phone circuitry. It generates a computed pseudo random code based on input of at least one of the pseudo random codes, wherein the computed pseudo random code, the input pseudo random code and the unique cell phone identification number are concatenated to generate a computed transaction code. The system also includes wireless connection between the secure cell phone body and the automated banking machine. The unique security transaction code is transmitted to the automated banking machine via the wireless connection, whereby such connection is a secure wireless connection based on the automated banking machine determining that the computed transaction code matches the unique security transaction code.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PRFERRED EMBODIMENT(S)

Figure 1:
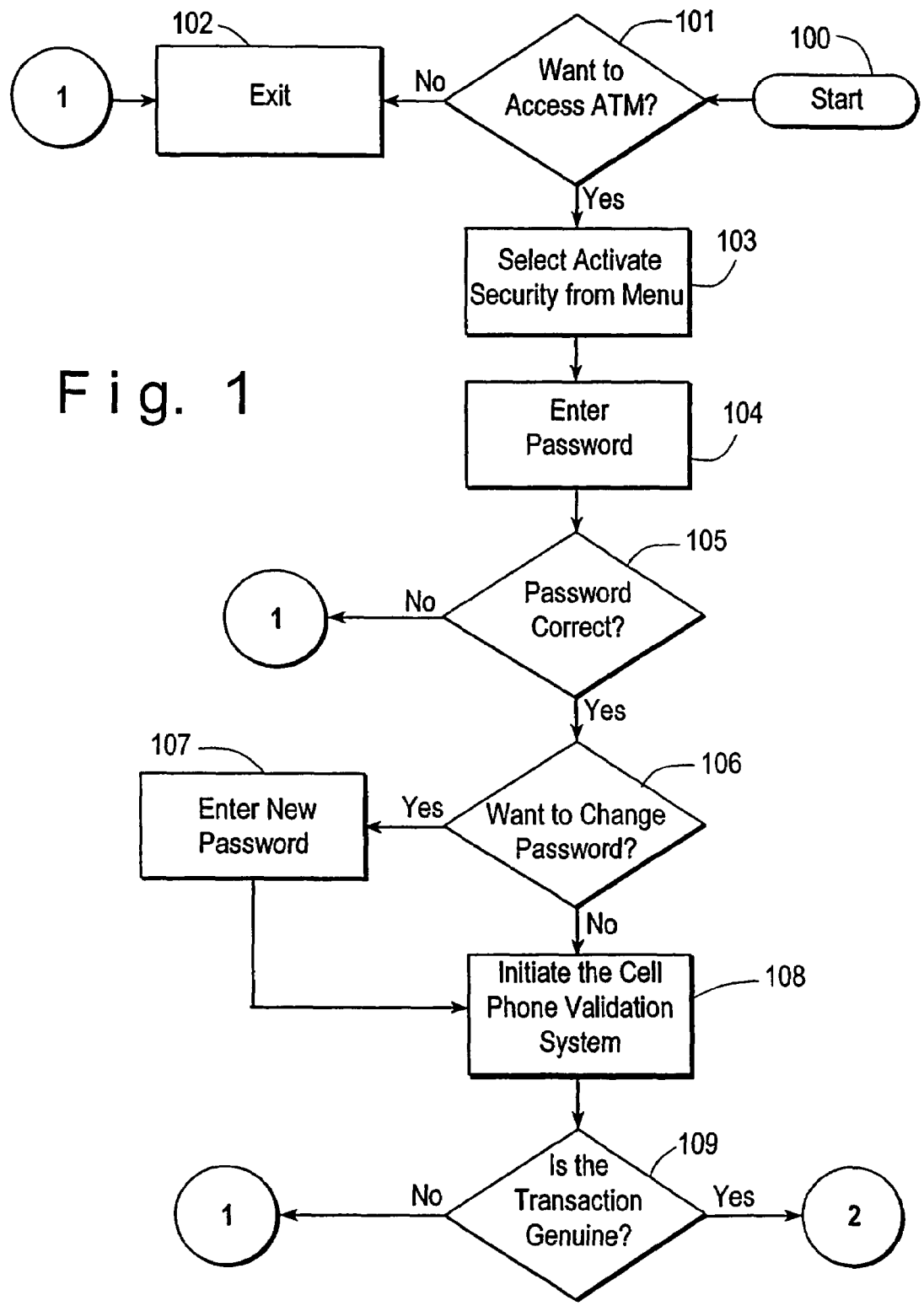
FIG. 1 is a flow diagram illustrating the method steps of the present invention of securely accessing an automated banking machine, particularly an ATM, using a secure cellular telephone.

In describing the preferred embodiment of the present invention, reference will be made herein to FIGS. 1–2 of the drawings in which like numerals refer to like features of the invention.

The present invention provides a method and system for securely accessing an automated banking machine using a secure cellular phone ("cell phone"). The secure cell phone contains electronic fuse (e-fuse) technology in combination with pseudo random number generator linear feedback shift registers (LFSRs) and a free running clock oscillator for providing a secure method of accessing an ATM. The cell phone dynamically generates pseudo random numbers (cycle counts) and a synchronized unique security transaction code to secure a transaction. By accessing an ATM using the present secure cell phone, a wide variety of banking transactions may be conducted including, but not limited to, cash withdrawals and deposits, check deposits, fund transfers between accounts, bill payment, check cashing, money order purchases, stamp purchases, ticket purchases, phone card purchases, account balance inquiries, and the like.

For purposes of this disclosure it should be understood and appreciated that an automated banking machine shall be deemed to include any machine for carrying out transactions, including transfers of value. However, for ease of understanding the invention, the preferred embodiment will be described in relation to securely accessing an automated teller machine ("ATM") using a secure cell phone of the invention.

Each secure cell phone of the invention is provided with a unique circuitry configuration that allows a user of the invention make a safe and protected request from the secure cell phone to an ATM machine. This secure cell phone includes electronic fuses (or e-fuse) in combination with two customized linear feedback shift registers (LFSR) and random cycle counts to provide a unique type of read only memory in the cell phone for making secure requests to an ATM. The preferred LFSR hardware concepts used in accordance with the invention are described in U.S. Pat. No. 6,641,050 to Kelley et al., assigned to the assignee of the instant application, the disclosure of which is hereby incorporated by reference. The invention further includes a software support package that is installed and stored on the receiving end, i.e., on the automated banking machine, such as an ATM. This software at least includes a synchronized security verification algorithm, i.e., a software emulator, for computing pseudo random number, a transaction processing function, and an account data base access interface.

The e-fuse technology in the secure cell phone permits burning (recordation) of essential, and/or alterable information, as a type of read-only memory both during cell phone manufacture and during use of the cell phone. For instance, the e-fuse allows for the permanent burning of the secure cell phone identification number during manufacture. The e-fuse also allows for the alterable burning of essential information on the cell phone circuitry both before and after manufacture, such as, burning a changeable pin number or password on the cell phone circuitry for allowing access to and use of the present secure cell phone.

The two LFSRs contained within the secure cell phone are referred to as a reference LFSR and a secure LFSR. These two LFSR circuits are a special configuration of a "logic linear circuit" into a special form of shift register or counter that can be either two equivalent forms or dual forms. The two LFSR circuits embedded within the secure cell phone advantageously enable a user of the cell phone to securely access an ATM by generating random pseudo numbers or codes for building a unique security transaction code. In so doing, the reference LFSR and secure LFSR are synchronized by a free running clock oscillator, which permits encoding of the information that is essential for securely accessing an ATM using the present cell phone. It is this combination of the LFSR circuits coupled with the free running clock oscillator that generate pseudo random binary string sequences that are used to encrypt information. These generated pseudo random binary string sequences are very large sequences sufficient for effective randomization.

In the present method of using a secure cell phone to securely accessing an ATM for conducting transactions thereon, a user must first start the system (step 100), e.g. by turning on the secure cell phone to activate its internal circuitry. The user then determines whether or not he would like to access an ATM using such secure cell phone (step 101). If the user does not want to access an ATM, then the present system is exited and the call may be ended (step 102). If, however, the user would like to access an ATM using the present secure cell phone, the process flow continues by the user selecting an activate security option from a menu on the secure cell phone (step 103). The user then enters a password or pin number (step 104), which is checked for correctness within the secure cell phone by matching such password or pin number to the password or pin number burned on the cell phone circuitry. The correct pin number allows the user to access to the present system for securely accessing an ATM using the secure cell phone (step 105), and the process continues (step 106). If the pin number is incorrect, the process flow is exited and the call ended (step 102).

At this point, the user must decide whether or not he would like to change his password or pin number for accessing the present system (step 106). If the user decides to change the password for accessing the present system on his secure cell phone, the user selects a new password or pin number and enters it into the cell phone using the keypad on the secure cell phone. The e-fuse contained within this secure cell phone then changes the password or pin by deleting the old password or pin and burning the new password or pin number on circuitry of the secure cell phone (step 107). If, however, the user does not want to change the current password or pin, then the process flow continues by making a call to an ATM from the secure cell phone.

Once a user has selected the security validation feature on the cell phone and entered a correct password or pin number, the present cell phone validation system must be initiated and activated (step 108). In so doing, a call is sent from the secure cell phone to an ATM machine for requesting a service at such ATM. The server running on the ATM receives this call and sends a signal back to the secure cell phone identifying the call recipient as an ATM server. Receipt of this signal authenticates that the call is between a secure cell phone and an ATM. Based on this authentication process, the present secure server transaction system is then initiated. Alternatively, rather than initiating the secure server transaction based upon authentication of receipt of a signal from the ATM server at the secure cell phone, the call may be initially identified as a call from a secure cell phone to an ATM server prior to sending such call. In so doing, an option from a menu system on the secure cell phone is selected which pre-identifies the call as being one to an ATM server before the call is sent to the ATM server. This alerts the present software running on the secure cell phone that the call will be made to an ATM server, such that the secure server transaction is initiated.

Upon initiation of the cell phone validation system, the present cell phone validation system is then activated. In so doing, the LFSR circuits embedded within the secure cell phone generate two pseudo random numbers that together with the cell phone ID number are sent to the ATM server for positively identifying the secure cell phone. This is accomplished as the secure code structure and associated code generation hardware within the cell phone include the two LFSR circuits shifting synchronously with the oscillator clock after the phone has been turned on, i.e., the LFSRs' count starts. It is the configuration of the secure LFSR, which is customized to a unique configuration for each cell phone and written in the cell phone via the e-fuses, that gives the special uniqueness to each cell phone. This configuration is very difficult, perhaps impossible, for thieves to replicate as it cannot be read from the cell phone itself. None of the memory configurations can be read or obtained from outside the cell phone. The reference LFSR has a standard feedback configuration and is used to maintain synchronization with the secure LFSR. By knowing the final state (counts) and configuration of the reference LFSR, one can determine the number of shift cycles clocked by the free running oscillator. Now, if a random time interval that gates the LFSRs shift clock is introduced, then pseudo random numbers can be generated by both LFSRs, which can be extremely large pseudo random binary sequences.

Based upon generation of the two pseudo random numbers, a unique security transaction code is generated by concatenating the secure cell phone ID and the received LFSR state information (i.e., the pseudo random code (cycle count) of the secure LFSR and the synchronizing random code (cycle count) of the reference LFSR). This unique security transaction code is continuously transmitted to the server controlling access to the ATM during the call, having encoded therein the two generated pseudo random numbers and the cell phone ID number. Upon receipt of such information, the ATM server uses this information to authenticate the call by positively identifying the particular calling cell phone and validating that the call is coming from a valid secure cell phone. This is accomplished by the ATM server determining the cell phone ID number from the concatenated unique security transaction code and looking up this received cell phone ID number. Based upon the particular cell phone ID number, the ATM server, through software running on the ATM, determines the particular unique LFSR circuits that are embedded within the cell phone using the received LFSR state information, and then matches the cell phone ID number with a software implementation of such unique LFSR circuits. This software implementation is a software emulator that resides within and is running on the ATM. Thus, the authentication and validation process is dependant upon the receiving end (or ATM server) knowing the unique configuration of the secure LFSR, which it gets from the secure cell phone ID.

Through use of the ATM software emulator, the ATM server then performs the pseudo random number generation function that is performed by the LFSR circuits of the cell phone. At the ATM end, one of the received pseudo random numbers (i.e. cycle counts) is input into the ATM software emulator. The input pseudo random number may be the cycle count of the secure LFSR or the synchronizing cycle count of the reference LFSR. The ATM software emulator then performs the random number generation task using the input pseudo random number to generate a computed pseudo random, which when concatenated with the input pseudo random number and the cell phone ID generates a computed transaction code.

The ATM software then determines whether or not the computed transaction code matches the unique security transaction code generated by the secure cell phone. If the computed transaction code matches the unique security transaction code, then the transaction is genuine (secure) and the present process of securely accessing an ATM using a secure cell phone continues. That is, in order for the transaction to be genuine and continue, the unique security transaction code generated by the LFSR circuits embedded within the cell phone must be duplicated at the ATM by the software emulator implementation. If, however, the computed transaction code does not match the unique security transaction code, then the transaction is not genuine (insecure) and the transaction is rejected at the ATM, thereby ending the process flow.

If the ATM software determines that the transaction is genuine, then the user must determine whether he wants to deposit cash (step 200), if not, withdraw cash (step 201), if not, deposit checks (step 205), and if not, perform an "other" type of banking transaction (step 207). If the user would like to deposit or withdraw cash, this task may be accomplished by either entering an amount via text messaging (steps 202 and 203) or entering an amount via a voice message (step 204). Alternatively, a text message concatenated with a voice message may be used to enter the banking transaction. If the user would like to deposit checks (step 205), the check amount is entered and check itself is deposited with the ATM (step 206.) If the user would like to perform some other banking transaction (step 207), then the "other" banking transaction type is selected (step 208).

Once the task to be performed has been determined by the user, and the communication of such desired task received by the ATM server, the ATM server then builds the transaction (step 209). In building the transaction, the ATM server receives and processes the cell phone ID number, the two pseudo random numbers, the banking transaction type, and any other information or component necessary for carrying out the selected transaction type (i.e., money), and then performs the desired banking transaction. Once completed, if the user would like to continue with another secure banking transaction (step 210), the process continues to the step of determining the next banking transaction to be performed (steps 200–208), and the process flow (steps 200–210) repeated. If the user would like to end the transaction, the system and process flow are exited and the call ended (step 102).

An essential feature of the invention is that once the ATM server authenticates a transaction and completes all banking transaction tasks from a particular cell phone within a single call, the ATM server stores the unique security transaction code, including the two pseudo randomly generated numbers, for that particular cell phone id. The unique security transaction stored code and pseudo random numbers are then used by the ATM server to prevent such code and numbers from being used again in connection with that particular calling cell phone for preventing any incidences of theft, fraud, unauthorized use, and the like.

It should be appreciated that components of the present invention may be embodied as a computer program product stored on a program storage device. These program storage devices may be devised, made and used as a component of a machine that utilizes optics, magnetic properties and/or electronics to perform certain of the method steps of the present invention. Such program storage devices may include, but are not limited to, magnetic media such as diskettes or computer hard drives, magnetic tapes, optical disks, Read Only Memory (ROM), floppy disks, semiconductor chips and the like. A computer readable program code means in known source code may be employed to convert certain of the method steps described below.

Figure 2:
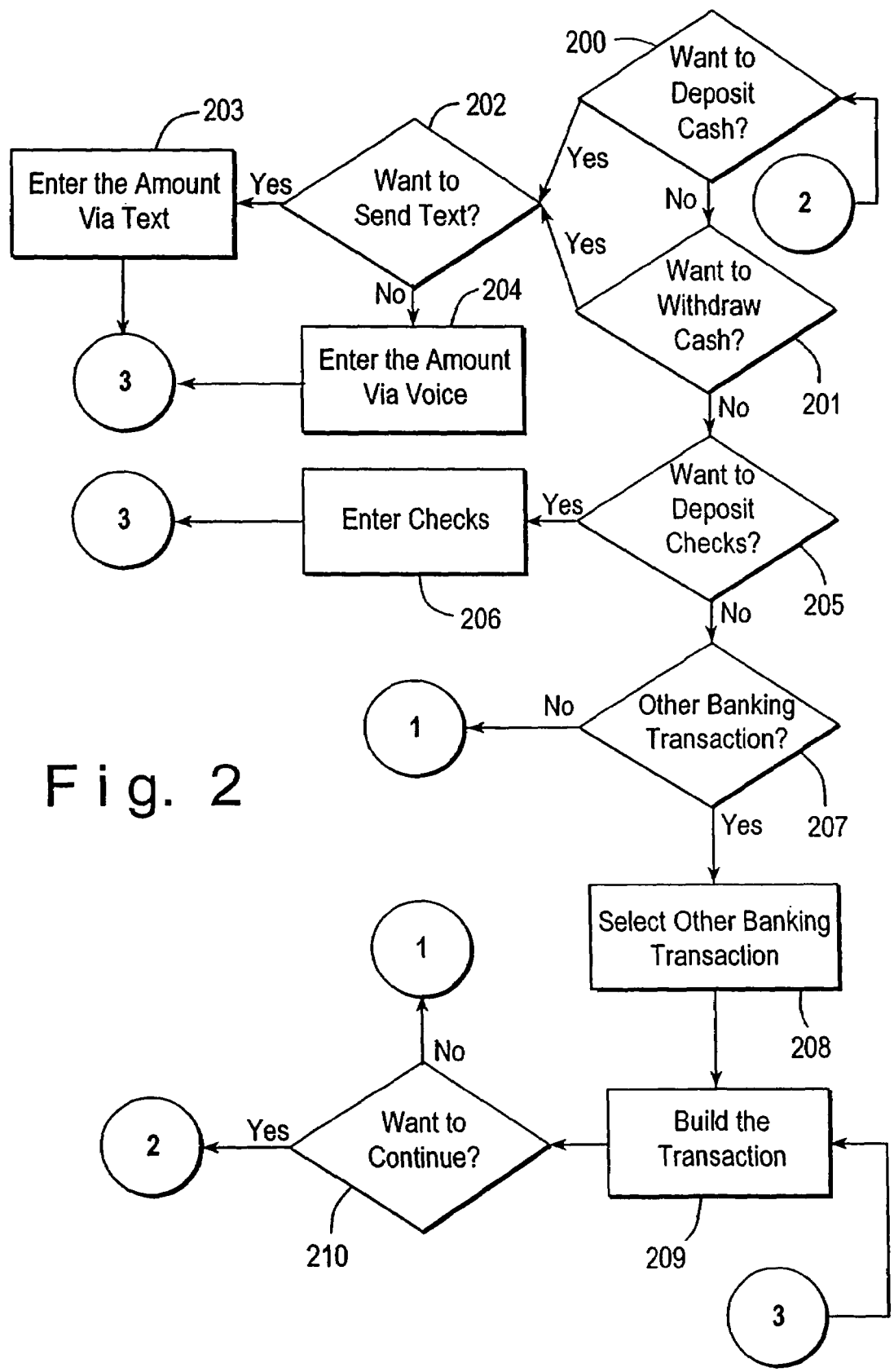
FIG. 2 is a flow diagram continuing the method steps of the invention shown in FIG. 1.

Flow charts of the process used in the present invention are shown in FIGS. 1 and 2. Numerals in circles indicate connections to and from other parts of the flow chart. FIG. 1 illustrates the method steps of the present invention of securely accessing an automated banking machine, particularly an ATM, using a cellular telephone. Again, for ease of understanding the invention, FIGS. 1 and 2 are described in relation to securely accessing an ATM by cell phone, however, it should be appreciated and understood a variety of automated banking machines may be securely accessed using cell phone in accordance with the invention.

FIG. 1 illustrates the method steps of the present invention of securely accessing an ATM using a cellular telephone, and the flow chart description is as follows:

100 Start. Start the process. Go to step 101.

101 Want to access the ATM? Once the system is initiated, a user of the system decides whether or not he wants to access an ATM from the user's cell phone. If no, the process goes to step 102 whereby the system is exited and the call ended. If yes, the user wants to access an ATM from his cell phone, the process flow continues to step 103.

102 Exit. The process flow and system are exited and the call is ended.

103 Select activate security from menu. The user selects a button on the cell phone to call-up a menu that includes a security validation feature. The user selects this activate security validation feature on the cell phone. Go to step 104.

104 Enter password. The user then enters in the password or pin number that will activate the security validation feature. Go to step 105.

105 Is the password or pin number correct? The entered password or pin number is checked for correctness. If the password or pin number matches the password or pin number burned on the e-fuse of the cell phone, then the process flow continues to step 106. If it is not the same as the password or pin number burned on the cell phone e-fuse, then the process flow continues to step 102 whereby the system exited and the call ended.

106 Want to change password? At this point the user may decide that he would like to change the password. If the user would like to change the password, the process flow continues to step 107 for entering a new password. Alternatively, if the user does not want to change the password, the process flow continues to step 108.

107 Enter a new password. The user determines a new password code, enters the new password into the cell phone, and then such password is physically changed and stored in the circuitry of the cell phone using the E-fuse process. Go to step 108.

108 Initiate the cell phone validation system. Once a call is made from a secure cell phone of the invention to an ATM for requesting a service at such ATM, and the correct password or pin number has been entered and verified at the cell phone, such call is received by a server running on the ATM and verified as being a call between a secure cell phone and an ATM server. The secure server transaction system is then initiated and activated whereby a unique security transaction code generated at the cell phone is transmitted to and received by the ATM server. This unique security transaction code includes the cycle counts of the two pseudo random numbers generated by the cell phone LFSR circuits and the cell phone ID number. Through software running on the ATM, the ATM then uses this information received from the cell phone to authenticate and validate that the call is coming from a valid secure cell phone. One of the received pseudo random numbers (i.e. cycle counts) is then input into a software emulator running on the ATM for generating a computed pseudo random, which when concatenated with the input pseudo random number and the cell phone ID generates a computed transaction code. Go to step 109.

109 Is the transaction genuine? The ATM software then compares the computed transaction code to the input unique security transaction code. If the computed transaction code matches the input unique security transaction code, then the transaction is genuine (secure) and the process flow continues to step 200. If the computed transaction code does not match the input unique security transaction code, then the transaction is not genuine (insecure) and the process flow ends at step 102.

FIG. 2 illustrates the method steps of continuing the method of FIG. 1 for securely accessing an ATM using a cellular telephone, and the flow chart description is as follows:

200 Want to deposit cash? Once the ATM software determines that the transaction is genuine (secure), the user must then decide if he would like to deposit cash. If yes, the process proceeds to step 202. If no, the process proceeds to step 201.

201 Want to withdraw cash? If the user does not want to deposit cash, the user must then decide if he would like to withdraw cash. If yes, the process proceeds to step 201. If no, the process proceeds to step 205.

202 Want to send text as a transaction to the ATM server? The user at the secure cell phone then determines whether or not he would like to send a message to the ATM via text. If the user wants to send a text message, the process continues to step 203. If the user does not want to send a text message, the process continues to step 204.

203 Enter the amount via text. If the user wants to send a text message, the user enters by text the amount of money (to deposit or withdraw) using a keypad on the cell phone which is then sent to the ATM during this single call. Go to step 209.

204 Enter the amount via voice. If the user wants to send a voice message, the user speaks the desired amount of money (to deposit or withdraw) into a receiver on the cell phone, which is then sent to the ATM during this single call. Go to step 209.

205 Want to deposit checks? If the user does not want to deposit or withdraw cash, the user must then determine if he would like to deposit a check(s). If the user would like to deposit one or more checks, the process continues to step 206. If, however, the user does not want to deposit any checks, the process continues to step 207.

206 Enter the checks. The user enters the check amount and deposits the checks with the ATM. Go to step 209.

207 Other banking transactions? If the user does not want to withdraw or deposit cash, nor deposit any checks, the user must then determine whether or not he would like to perform any other banking transaction tasks. If yes, the process continues to step 208. If no, the process continues to step 102 and both the process and the call are ended.

208 Select other banking transaction. The user selects the desired banking transaction type to be performed during this single call. Go to step 209.

209 Build the transaction. Once the desired banking transaction type has been selected by the user, and the communication of such desired task is received at the ATM server, the ATM server then builds the transaction. The transaction includes the received secure cell phone ID number, the two pseudo random numbers, the banking transaction type, and any other information or component necessary for carrying out the selected transaction type. The ATM server then processes the transaction and performs the banking transaction task selected by the user. Once completed, the process flow continues to step 210.

210 Want to continue? The user must then determine if he would like to perform another banking transaction within the current single call between the secure cell phone and the ATM. If the user wants to perform another banking transaction during this call, the process flow continues to step 200, and steps 200–210 repeated until the user decides that he does not want to perform any other banking transactions within the single call. If the user does not want to perform any other banking transactions within such call, the process flow continues to step 102 and the system and call are exited.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A method for securely accessing an automated banking machine by cell phone comprising:

providing a cell phone containing circuitry that generates a unique security transaction code, said unique security transaction code is comprised of a unique cell phone identification number for said cell phone concatenated with two pseudo random codes;

calling an automated banking machine from said cell phone;

determining a software emulator of said circuitry embedded within said cell phone at said automated banking machine, said software emulator running on said automated banking machine;

inputting at least one of said pseudo random codes into said software emulator to generate a computed pseudo random code, which when concatenated with said input pseudo random code and a cell phone identification number determined at said automated banking machine generates a computed transaction code; and securely accessing said automated banking machine using said cell phone if said computed transaction code matches said unique security transaction code.

2. The method of claim 1 wherein said method steps are initiated by selecting an activate security option from a menu on said cell phone and entering a valid password into said cell phone.

3. The method of claim 1 wherein after said step of calling said automated banking machine from said cell phone, said method further comprising:
   authenticating that said call is coming from a secure cell phone by sending a communication between said automated banking machine and said cell phone;
   sending said unique security transaction code to said automated banking machine from said cell phone if said call is authentic; and
   determining said cell phone identification number at said automated banking machine using said received unique security transaction code.

4. The method of claim 3 wherein said communication for authenticating said call is a signal sent to said cell phone from said automated banking machine during said call.

5. The method of claim 3 wherein said communication for authenticating said call comprises a cell phone pre-identification that identifies said call as coming from a secure cell phone to said automated banking machine prior to sending said call.

6. The method of claim 1 wherein said circuitry of said cell phone comprises:
   a read only memory device;
   a secure linear feedback shift register having a unique linear feedback shift register sequence associated with said cell phone;
   a reference linear feedback shift register; and
   a free running oscillator,
wherein said secure linear feedback shift register is driven by said free running oscillator to generate a first of said two pseudo random codes, while said reference linear feedback shift register is driven by said free running oscillator to generate a second of said two pseudo random codes.

7. The method of claim 6 wherein said first and second pseudo random codes are extremely large unique pseudo random binary sequences.

8. The method of claim 6 wherein said step of determining said software emulator within said automated banking machine comprises the steps of:
   determining a type of said secure linear feedback shift register using said first pseudo random code concatenated within said unique security transaction code;
   determining a type of said secure reference feedback shift register using said second pseudo random code concatenated within said unique security transaction code;
   matching a software implementation of said determined types of said secure and reference linear feedback shift registers within said automated banking machine; and
   selecting said software emulator corresponding to said software implementation.

9. The method of claim 1 wherein after said automated banking machine has been securely accessed using said cell phone, said method steps further including:
   selecting a desired banking transaction to be performed at said cell phone;
   transmitting said desired banking transaction to said automated banking machine via said secure call;
   performing said desired banking transaction at said automated banking machine during said secure call; and
   repeating said previous three steps until all desired banking transactions are completed during said secure call from said cell phone to said automated banking machine.

10. The method of claim 9 wherein upon completion of all said desired banking transactions, said automated banking machine storing said unique security transaction code associated with said cell phone to prevent said unique security transaction code from ever being used again in connection with said cell phone.

11. A secure cell phone comprising:
   a cell phone body that includes at least a unique cell phone identification number, a read only memory device, a secure linear feedback shift register and a free running oscillator, said secure linear feedback shift register being driven by said free running oscillator to produce a first cycle count;
   a reference linear feedback shift register incorporated in said cell phone body and synchronized to the secure linear feedback shift register via said free running oscillator, said reference linear feedback shift register being driven by said free running oscillator to produce a second cycle count;
   a security code generator incorporated in said cell phone body and producing a unique security transaction code that incorporates said unique cell phone identification number and said first and said second cycle counts; and
   a wireless communication interface incorporated in said cell phone body for providing an input/output message function of secured information, which includes said unique security transaction code, between said cell phone body and an external automated banking machine.

12. The secure cell phone of claim 11 wherein said read only memory is comprised of a plurality of integrated electronic fuses.

13. The secure cell phone of claim 11 wherein said secure linear feedback shift register includes a unique linear feedback shift register sequence associated with said cell phone, said unique linear feedback shift register sequence being of sufficient length to provide for extremely large unique sequences.

14. The secure cell phone of claim 11 wherein said first cycle count is a state of said secure linear feedback shift register.

15. The secure cell phone of claim 14 wherein said second cycle count is a state of said reference linear feedback shift register.

16. The secure cell phone of claim 11 wherein said wireless communication interface is a contact-less interface whereby communications between said secure cell phone and said external automated banking machine input/output do not require physical contact with the secure cell phone thus providing a medium for exchanging security code information.

17. The secure cell phone of claim 16 wherein said wireless communication interface is a contact-less source using radio frequency energy.

18. A secure system for accessing an automated banking machine from a secure cell phone comprising:
   a secure cell phone body containing circuitry that generates a unique security transaction code, said unique security transaction code is comprised of a unique cell phone identification number for said cell phone concatenated with two pseudo random codes;
   an automated banking machine;

a software emulator of said cell phone circuitry within said automated banking machine, said software emulator generating a computed pseudo random code based on input of at least one of said pseudo random codes, wherein said computed pseudo random code, said input at least one pseudo random code and said unique cell phone identification number are concatenated to generate a computed transaction code;

a wireless connection between said secure cell phone body and said automated banking machine for transmitting said unique security transaction code to said automated banking machine, said wireless connection being a secure wireless connection based on said automated banking machine determining that said computed transaction code matches said unique security transaction code.

19. The secure system of claim 18 wherein said circuitry of said cell phone comprises:

a read only memory device;

a secure linear feedback shift register having a unique linear feedback shift register sequence associated with said cell phone;

a reference linear feedback shift register; and a free running oscillator, wherein said secure linear feedback shift register is driven by said free running oscillator to generate a first of said two pseudo random codes, while said reference linear feedback shift register is driven by said free running oscillator to generate a second of said two pseudo random codes.

20. The secure system of claim 19 wherein said first and second pseudo random codes are extremely large unique pseudo random binary sequences.

* * * * *